United States Patent [19]

Gladish

[11] Patent Number: 4,579,320

[45] Date of Patent: Apr. 1, 1986

[54] LOAD SUPPORTING MEMBER

[75] Inventor: Herbert E. Gladish, Ottawa, Canada

[73] Assignee: E. B. Eddy Forest Products, Ltd., Ottawa, Canada

[21] Appl. No.: 725,678

[22] Filed: Apr. 22, 1985

Related U.S. Application Data

[62] Division of Ser. No. 543,976, Oct. 20, 1983.

[30] Foreign Application Priority Data

Jun. 30, 1983 [CA] Canada .................................. 431658

[51] Int. Cl.$^4$ .......................... F16M 5/00; F16F 13/00
[52] U.S. Cl. .................................. 267/140.1; 267/151;
267/42; 267/47; 406/88; 104/23 FS; 198/811;
108/51.1; 248/346
[58] Field of Search ................ 108/51.1, 56.1; 406/88;
198/811, 821; 104/23 FS; 267/140.1, 151, 42,
47; 248/346

[56] References Cited

U.S. PATENT DOCUMENTS 3,625,157 12/1971 Hart ................................. 104/23 FS

FOREIGN PATENT DOCUMENTS

1066645 10/1979 Canada ........................... 104/23 FS

Primary Examiner—Jeffrey V. Nase
Assistant Examiner—L. E. Williams
Attorney, Agent, or Firm—Peter L. Klempay

[57] ABSTRACT

Improvements to the various components of hydrostatic bearing levitation systems, systems wherein fluid pressure between a load and the rails of a track system supports and guides the load, are described. The rail has a plurality of lengthwise extending ports and nozzles communicating from the innermost ports through the curved upper wall to the interface area between the rail and the load. The nozzles are arranged in longitudinally aligned groups and in a pair of parallel rows with the groups of one row being longitudinally staggered with respect to the groups of the other row. The nozzles can be inexpensively produced by boring an oversize hole through the upper wall and fixing a cannula, such as a hypodermic needle, in the bore. The cannula's internal diameter is the desired nozzle diameter. The load support member has a compliant outer cover, a central core, and a filler material wound tightly on the core. The filler material is a cellulosic sheet material having a high percentage of groundwood and little or no crepe. The improved components cooperate together to provide a low-cost load/mover whether for palletized loads in a warehouse or even for inter- or intra-urban transportation systems.

18 Claims, 21 Drawing Figures

LOAD SUPPORTING MEMBER

This is a division of application Ser. No. 06/543,976, filed on Oct. 20, 1983.

The present invention relates in general to improved rails to be utilized in hydrostatic bearing levitation systems; that is, in systems using fluid pressure to support and guide heavy loads as they move along a track system using such rails.

BACKGROUND OF THE INVENTION

While the principle of utilizing air pressure to support and guide a load as it moves along a track is not new, improvements in load-carrying efficiency have been achieved through the implementation of a system using rail sections having a concavely curved upper surface and by providing load supporting members which have a convexly curved compliant outer surface for mating with the rail surface. Nozzles leading from an air plenum within the rail through the upper wall exit at the curved upper surface thereof and are angled with respect to three ortogonal planes, one of which is tangent to the rail surface where the nozzle axis intersects that surface. The nozzles are angled so that their net effect is a fluid film wedge reaction on the load supporting member which directs it in the desired direction and which also tends to displace the load and the supporting film wedge towards one side of the rail. The principles outlined in very basic terms above are applicable to material handling systems, as in single-rail systems operating as an air-conveyor for trans-porting cyclindrical objects such as paper rolls, or in twin-rail track systems for transporting pallets from a loading or unloading dock into or out of a transport trailer, or holding and feeding pallets in and through a gravity flow racking system, and they are also applicable to so-called "people-movers" such as interor intra-urban transportation systems. The principles underlying the systems briefly outlined above are covered in one or more Canadian patents including numbers 950,853 issued July 9, 1974 for "Air Conveyor"; 1,002,565 issued Dec. 28, 1968 for "Vehicular Transportation System"; and 1,066,645 issued Nov. 20, 1979 for "Air Film Supported and Guided Load Support Member".

In general, systems such as those described in the aforementioned patents may be broadly characterized as compliant hydrostatic bearing levitation systems for moving heavy loads along supporting rails. The systems utilize "shoes" of cellulose or like material wound tightly about a collapsible core and enclosed by a deformable but stiff cover of flexible plastic or metal, which shoes exhibit low friction properties when in juxtaposition with a trough-like section of support rail, curved at a radius only slightly greater than that of the shoe. The shoes move freely in the rail(s) when small nozzles in the curved rail surface exhaust fluid therethrough under pressure in particular patterns to create fluid cavity cells and fluid lubricated seal areas under the shoes, the shoes being guided by the fluid film wedge formed with the curved contour of the rail section.

While the structures which utilize the air film technology described in the aforementioned patents have proven to be very effective, further research into the operating theory and the real-life requirement of producing a product at a marketable cost has resulted in significant improvements, especially with respect to the rail configuration. Included in the portions requiring improvement were: the rail cross-section, including the arc of the curved upper surface; the manner in which the nozzles are produced, including the size, location and number required for optimum air flow rates and power usages; the control mechanisms for fluid flow (activation and deactivation) to the nozzles; the manner in which rails could be joined end-to-end without pressure loss and without any rail rigidity loss or any appreciable misalignment (essentially on a microscopic scale due to the thin-film fluid bearing created at the interface between the load and the rail upper surface); and the provision of auxiliary devices such as timers, valves, controls, pulse-pressure mechanisms, resonating cavities and linear motors for powering large-scale loads such as containers or "vehicles" per se.

SUMMARY OF THE INVENTION

The present invention represents an improved rail which reflects optimization of most, if not all, of the operating areas enumerated above. The improved rail of the invention may be extruded inexpensively from a commercial grade of aluminum; it can be quickly and accurately joined end-to-end to an adjacent rail; its nozzle size, configuration, layout and operation promote efficiency; and it is adaptable to many different configurations depending on the ultimate usage to which it is to be applied. These features will be briefly discussed below.

While the rail could be fabricated from a rolled or extruded from a copolymer such as polyvinylchloride (PVC) or reinforced polyethylene, the greatest success has been achieved with a rail extruded from commercial aluminum stock. The rail includes internal vertical partitions between the upper and lower walls dividing the interior into longitudinally extending ports or passageways which carry the pressurized fluid and obviate any need for separate headers or storage reservoirs for the fluid supply. A very desirable rail configuration includes three internal partitions which, along with the side walls of the rail, define four parallel longitudinal ports or passageways in each rail.

Such a rail, in combination with a unique nozzle arrangement and control system, makes the rail of this invention particularly suited for controlled product flow in gravity sloped storage racks of the first-in first-out type. In this configuration, the nozzles are arranged in two rows in longitudinally spaced apart groups or sets with the groups of one row being associated with one of the ports and the groups of the other row being associated with another of the ports. Typically the two innermost ports would be used. Furthermore, the groups of one row of nozzles would be longitudinally staggered with respect to the groups of the other row of nozzles. Depending on the length of each group there could be overlap between the staggered groups of nozzles in the two rows. The length of each group would be related to the length of whatever load, such as a pallet, was to be levitated in the track system or to the desired length of travel of a pallet or a group of pallets. In most cases the length of the load to be carried, or at least the total length of the shoes supporting the load, would be approximately related to the length of each group of nozzles depending on the movement or interaction with the rail required.

The use of staggered groups of nozzles permits a load supported by sectionalized lengths of rail to be indexed, in a controlled manner, on application of pulses of fluid, forwardly by manual or automatic means, or on a sloped gravity flow track a set distance corresponding to a group length by applying fluid pressure alternately to the two ports supplying the nozzles. Thus, if only one port is pressurized the load would advance a distance corres-ponding to one group only, where the open distance between loads allows. In order to advance or index the load for-wardly, the other port would be pressurized so that the next group of nozzles, residing in a staggered group communicating with the other port, would levitate the load for advancement. If both ports are pressurized simultaneously, the load will be able to move continuously along the track, being levitated alternately as it moves by nozzles supplied by one port and then by nozzles supplied by the other port. If only one port is pressurized the load travel is limited to the length of a nozzle group as there is a space which has no levitation fluid film between the actuated group of nozzles and the next group communicating with the pressurized port.

Overlap at the ends of alternate staggered groups permits smooth transition from group to group and also permits special movement situations. For curved sections the spacing between the groups of the longer (outer) port could be increased, or decreased, if desired, to cater to the sideways forces due to centrifugal or gravity effects encountered with banked tracks. Similarly, when a track inclines in elevation the spacing between groups could be reduced to provide greater overlap between the staggered groups. Conversely, spacings could be increased to reduce overlap in declining-elevation tracks.

Simple OR or AND/OR control valves can be used to control the flow of fluid to pressurize a selected one, or both, of the ports providing pressurized fluid to the nozzle groups. With a four-way spool valve having a neutral "off" position a single spool operator ensures that only one or the other of the nozzle groups can operate, automatically providing an interlock feature.

Insofar as the nozzle structure and configuration is concerned, it has been determined that an optimum spacing between adjacent angled nozzles of a group is approximately equal to the rail width. This permits the formation of separate levitation "footprint" cells of fluid film propagation or dispersion along the length of a shoe and also aids in the creation of "dither" or vibrations in the shoe cover, a phenomenon which is known to reduce stiction between the shoe and the rail interface fluid cavity seal areas. Also, the construction of the nozzle can be enhanced if, instead of drilling by mechanical, electric discharge or laser techniques a bore of nozzle diameter extending through the curved upper wall, a bore of larger diameter is provided and that bore is filled with a cannula of the desired small nozzle diameter, the outer wall of the cannula forming a tight, suitably sealed fit with the bore provided in the rail upper wall. The cannula, which may desirably be a hypodermic needle, may be bonded in the rail bore, as by an epoxy adhesive, if necessary. By using a cannula for the nozzle a portion thereof may extend into the port beyond the inner surface of the upper wall to provide desirable lower power flow characteristics through the nozzle. Fluid power characteristics may also be improved by using an interrupted cannula which defines one or more flow turbulence cavities between the sections thereof. Furthermore, the outermost end of the cannula may be inset below the outer surface of the upper wall surface so that a portion of the original larger bore is exposed to the rail surface, creating an enlarged nozzle portion adjacent the upper surface which acts as a resonant, turbulence or distribution chamber and, in fact, aids in enhancing the flow losses of the fluid entry to the shoe/rail interface cavity and/or the desirable dither effect of the shoe cover. Since a hypodermic needle is usually formed from stainless steel and since the rail is usually extruded aluminum, it can be seen that the cannula will likely have a smoother surface than a straight drilled nozzle in the rail and that it will likely have better wear properties for extreme nozzle fluid velocities. Also, the entry portion of the cannula can be provided with special flow limiting features to provide additional nozzle power reductions. The features include an angled cut-off, sharpening and/or turbulence grooving treatments.

DESCRIPTION OF THE PREFERRED EMBODIMENT

THE RAIL

Figure 1:
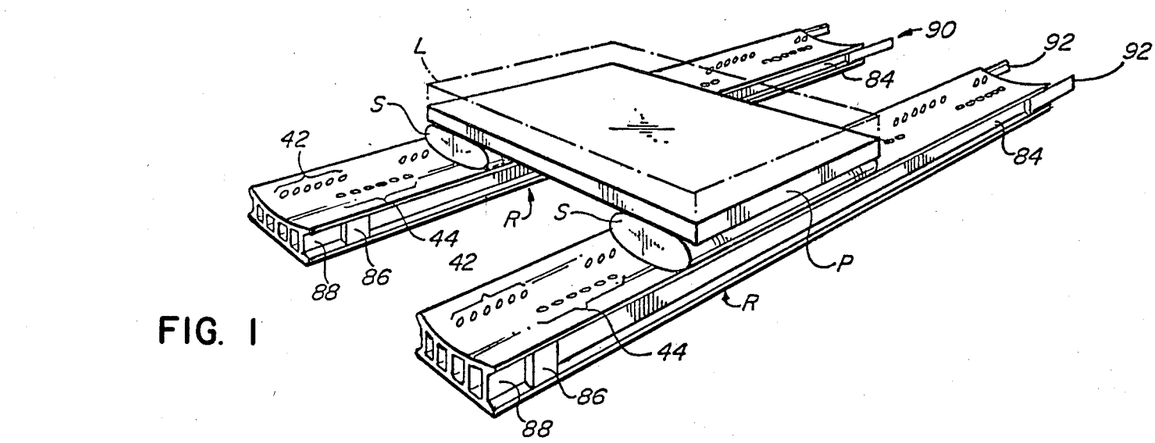
FIG. 1 shows, in perspective, a simplified basic article transport system using the rail of the present invention.

FIG. 1 of the drawings is intended to illustrate a basic transport system utilizing the rail section of the present invention. Such a system includes a load L, shown in this figure as being on a pallet P, supported by a pair of spaced apart members (shoes) S, and a track made up of a pair of rails R. It is understood that several (or many) rails may be used in parallel and may be connected end-to-end to form the track, the connection mechanism to be described hereinafter. It is also understood that the load could take any one of a number of different configurations ranging from individual cylinders of product or wound paper, through to pallets (as shown), and to vehicular modules for freight and/or people moving. The illustrated pallet is intended to be representative of all loads and should not be construed as a limitation of the invention or of systems using the invention.

Figure 3:
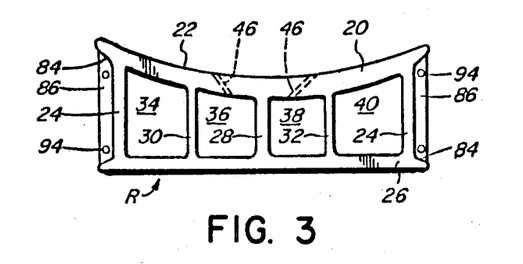
FIG. 3 shows an end view of the rail of the present invention.

The rail R is shown in end view in FIG. 3 wherein it is seen to have a concave upper wall 20, the upper surface 22 of which has a radius of curvature slightly greater than that of the shoe S in its operative (compressed) condition. A pair of side walls 24 are provided, inset from the longitudinal edges of the upper wall and extending from the upper wall to a generally planar bottom wall 26, the longitudinal edges of which extend or project laterally outwardly of the adjacent side wall 24. At least one partition 28 extends between the upper and lower walls to create a longitudinally extending port on each side. In the preferred embodiment of FIG. 3, three partitions 28, 30, 32 are used, creating with the side walls four longitudinally extending ports or passageways 34, 36, 38 and 40.

The basic principles on which loads may be carried by rails of the present invention necessitates the provision of a plurality of nozzles extending from a pressurizable plenum within the rail, through the upper wall, and exiting at the curved upper surface of the rail. In accordance with the basic U.S. Pat. No. 950,853, the nozzles should be assymetrically disposed with respect to the longitudinal axis of the rail and they should be angularly disposed with respect to at least three orthogonal planes, one of which is tangent to the upper surface of the rail at the intersection of the nozzle axis with the surface. The basic patent taught two rows of nozzles disposed as defined above and extending along the full length of the rail with a uniform spacing between adjacent nozzles.

Rails in accordance with the basic patent operate very well but they do have certain drawbacks. In particular, it becomes difficult to control the movement of loads therealong when it is desired to index or shunt the loads along a sloped rail in a controlled manner, as in a warehouse gravity flow racking environment. Also, by having all nozzles exposed to fluid pressure, long rails of the basic patent require more energy to provide the necessary fluid flows than may be desirable, especially with single pallet loads.

The rails of the present invention represent an improvement over rails of the basic patent and provide some power and control features lacking in the original rails. In addition to the cross-sectional shape of the rail, as described above, the other major differences between the original rails and those of the present invention lie in the use of a single row of nozzles, in the disposition of the nozzles and in the configuration thereof, including the method of forming the nozzles in the upper wall of the rail.

Figure 2:
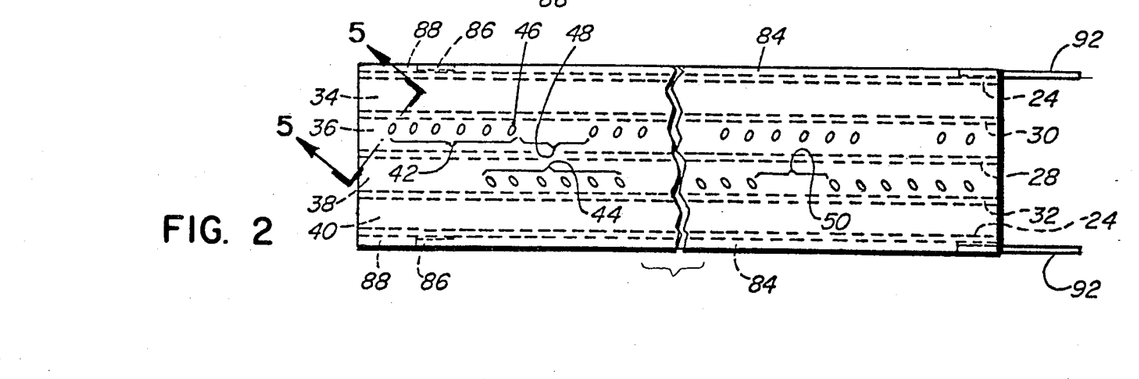
FIG. 2 shows a plan view of a rail of the present invention.
Figure 5:
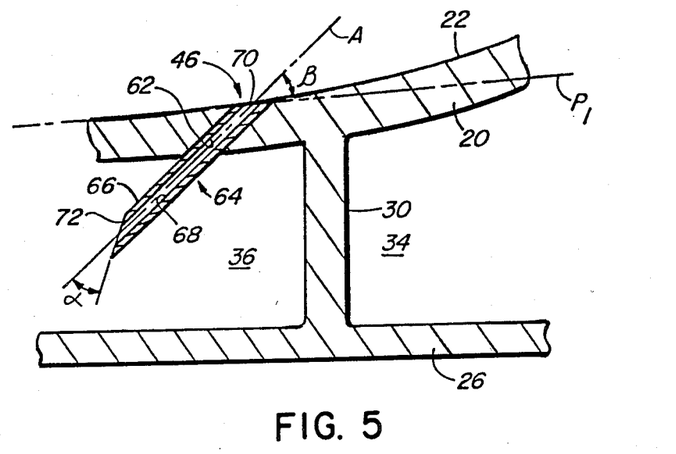
FIG. 5 shows a nozzle configuration taken on the line 5—5 of FIG. 2, FIGS. 6, 6a, 6b and 6c show alternate nozzle configurations.

With particular reference to FIGS. 1 and 2, it will be seen that the rail is provided with groups 42, 44 of nozzles 46. Groups 42 are longitudinally aligned with each other along the rail and adjacent groups are separated by a space 48. As seen in FIGS. 2 and 5 the nozzles 46 of groups 42 communicate with and are associated with port 36, one of the two innermost ports of the rail. Groups 44 are also longitudinally aligned with each other along the rail and adjacent groups are separated by a space 50. The nozzles 46 of groups 44 communicate with and are associated with port 38, the other of the two innermost ports of the rail.

As seen in FIGS. 1 and 2 the groups 42 of nozzles 46 are longitudinally staggered with respect to the groups 44 of nozzles 46. Generally speaking, each group 44 lies laterally opposite a space 48 and each group 42 lies laterally opposite a space 50. The number and positioning of groups 42 and 44 are such that when rails are joined end-to-end there will be a smooth transition from rail to rail with no interruption of the longitudinal nozzle pattern, whereby a load progressing along a track made up of a plurality of end-joined rails will not be materially aware of the joints between end-adjacent rails.

Generally speaking, unless greater movements are required for straight lengths of rail a space 48 will be equal in length to a space 50 and the length of each group 42, 44 of nozzles will usually be longer than the length of the shoe used for load support. Furthermore, to ensure a smooth transition from one group of nozzles to those of the staggered adjacent group of nozzles, the end few nozzles of the staggered adjacent groups may overlap longitudinally of the rail.

Variations in the spacings 48, 50 may be desirable for particular track requirements. For example, if the direction of load movement necessitates a positive elevation change the spacings 48, 50 might be reduced in length in comparison to what they might be for horizontal track portions, perhaps increasing the degree of overlap between the staggered groups of nozzles, to ensure minimum propulsion powers or to minimize whatever deceleration of the load might occur. For negative elevation changes, the spacings 48, 50 might be inceased somewhat. Also, with horizontal curved sections the spacing between groups of nozzles along the "outside" and between groups of nozzles along the "inside" of the curve might be decreased, thereby providing improved support by way of increased volumes or pressures of pressurized fluids offsetting the effects of centrifugal or gravity forces acting on the load as it travels along the curved track and the slight misalignment of the shoe in the curved rails. In an extreme case a slightly tipped or banked track might be provided with only one row of nozzles communicating with the outside one of the innermost ports. In this extreme case the spacing between the outside groups of nozzles would be equal to the spacing between adjacent nozzles of the groups while the spacing between the inside groups of nozzles would be equal to the length of the curved rail section, thereby eliminating the inside groups of nozzles. As another alternative, if the circumstances warrant, both rows of nozzle groups could have their inter-group spacings reduced and both supply ports pressurized so that both rows of nozzles are simultaneously energized for greater load support.

THE NOZZLES

The construction and orientation of the nozzles will now be described with particular reference to FIGS. 5, 6, 6a, 6b and 6c.

The prior patent, as indicated above, taught that the nozzles should be disposed so that they were angled with respect to three orthogonal planes, one of which is tangent to the surface of the rail at the intersection of the nozzle axis with that surface. That disposition gave each nozzle a longitudinal component, preferably in, but not restricted to, the direction of load movement along the rail.

Further testing and examination of nozzles and the interaction between the nozzle, rail and the load-supporting shoe, have revealed several important modifications and improvements to the original nozzle concepts.

Figure 7:
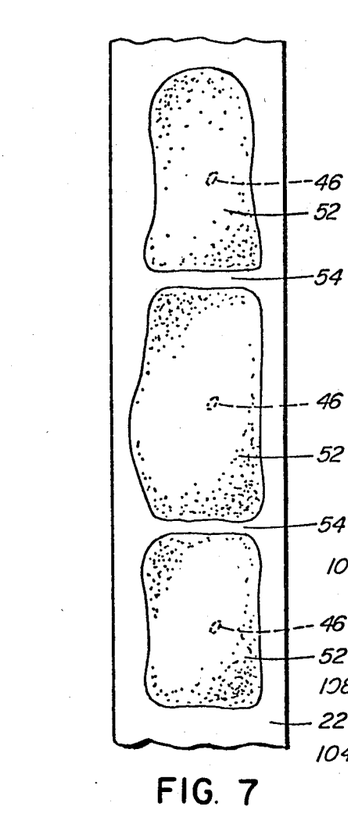
FIG. 7 shows the orientation and configuration of pressure cells formed between the shoe cover and the rail surface by the fluid jets issuing from the nozzles.
Figure 8:
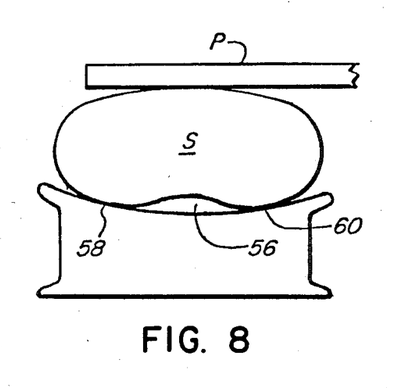
FIG. 8 shows, in partial section, a cavity and attendant seal areas formed in the shoe.

Flow visualization techniques have shown that with single aligned nozzles (rather than the originally-developed, assymmetrically-positioned, nozzle pairs) at a separation approximately equal to the rail width, there appear to be "cells" 52 of pressurized flow created at each individual nozzle, each cell extending approximately equal distances on each side of the nozzle, and adjacent cells being separated by a "stagnation" line 54 delineating each cell from its neighbour (FIG. 7). The separate cells formed between the rail surface and the shoe accommodate changes or fluctuations in pitch, providing the necessary restoring forces due to inherent pressure increases with increased loading or gap reduction. Without this restoring force the fluid cushion between the shoe and the rail surface might collapse and direct, unwanted, contact of the shoe with the rail surface might occur. The best cell structure has been obtained with nozzles at a spacing approximately equal to the rail width, pointed into the converging gap between the convex shoe surface and the concave rail surface and proximate to one of the seal areas of the shoe cavity. FIG. 8 shows, on a very exaggerated scale, the cavity 56 formed in the shoe itself adjacent the rail surface by the fluid flow jet exiting from the nozzle with the seal areas 58, 60 being shown as well. With the nozzles groups as illustrated, those of groups 42 would be directed towards seal area 58 while those of groups 44 would be directed towards seal area 60. Since the shoe and its support load are moving along the rail while the nozzles are stationary, the cavities 56 are in a dynamic state, continuously being created adjacent the front of the shoe and progressing to the rear as the shoe advances. The flow velocities and cavity depth in theory are in a dynamically unbalanced state and, surprisingly, that is an advantage with this invention. This unbalance creates a desirable dynamic "dither" of the shoe cover, as supported by the filler, at the seal area which tends to reduce "stiction" and improves the propagation of the air film and the ease with which a load can progress along a rail.

Insofar as the orientation of the nozzles is concerned it is considered to be very desirable for them to be at a transverse angle for reduced nozzle exit losses. Although it is not deemed absolutely necessary to provide a longitudinal component to the jet issuing from the nozzle, it is preferable to angle the nozzles at about 45° to the longitudinal axis to provide more efficient levitation and a movement component along the track. Thus, the nozzle need be angled only with respect to a longitudinally extending plane which is tangent to the rail surface at the intersection thereof with the nozzle axis. The angled nozzle jet has been found to be more efficient, providing more levitation power, than a radially directed nozzle jet. The angled jet produces skin flutter with less losses at the outlet, where fluid is introduced to the shoe/rail interface. Also an angled jet having an angled inlet within the rail supply port exhibits reduced open track air losses. Thus, the angled nozzle provides the least resistance to air flow under the shoe on the rail but also provides the most inlet resistance for least flow from uncovered nozzles to the atmosphere.

FIG. 5 shows several of the features discussed above and also shows a desirable nozzle construction which reduces greatly the cost of manufacture. In FIG. 5, the nozzle 46 has an axis A which is at an angle $\beta$ to a plane $P_1$, which, in turn, is tangent to the rail surface 22 at the intersection, the nozzle 46 being directed transversely of the rail itself. Preferably, the angle $\beta$ is in the region of 20° although an optimum angle might have to be developed experimentally for any particular rail/load application.

The nozzle is constructed by simply boring a hole of the desired diameter through the rail upper wall or, preferably, by boring a hole 62, larger than the desired nozzle diameter, through the rail upper wall 20 at the angle $\beta$. Then a cannula 64 having an outer diameter approximately equal to the diameter of the hole 62 is inserted into the hole so that a major portion 66 thereof projects into the port 36. The cannula 64 has an inner bore 68 of the desired nozzle size. The upper end face of the cannula is angled as at 70 so as to be generally coplanar with the rail outer surface 22 at the periphery of the bore 62. The inner end face of the cannula is preferably steeply angled or bevelled as at 72 or otherwise modified with a rough or notched surface so as to provide a high loss inlet which, in turn, reduces the flow from uncovered nozzles to the atmosphere. This avoids the need to use very small nozzle bores which may be prone to clogging. The bevel angle $\alpha$ is suggested to be in the range of 10° to 20° to the nozzle axis but, again, circumstances might dictate an angle outside the suggested range.

Tests have shown that the cannula 64 could be a commercially-available hypodermic needle modified so as to have the desired end face configurations. The needle could be secured in the hole 62 by an interference fit therewith or it could be bonded to the rail by a suitable adhesive, such as an epoxy adhesive.

Figure 6:
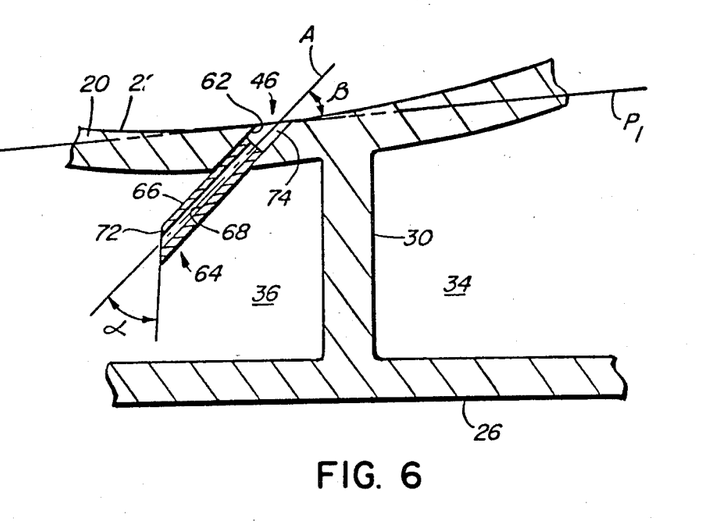

FIG. 6 shows a slightly different nozzle configuration wherein the outer face is normal to nozzle axis A and is recessed below the rail outer surface 22. This creates an enlarged nozzle chamber portion 74 adjacent the rail surface 22 of the diameter of the hole 62. The enlarged chamber portion reduces exit losses of the fluid flow into the shoe cavity and acts as a resonant chamber for the nozzle jet, optimizing the nozzle advantages.

The angled nozzle tends to be self-cleaning as the jet velocity is able to act on dirt collected in the outlet when no fluid is passing therethrough. This can be augmented if the outlet of the nozzle is radiused so as to increase outlet efficiencies. The projected tube or cannula entry portion 66 also serves to reduce dirt or moisture entry into the nozzle from the supply port (36,38) as it operates in a manner similar to a dry pipe or a clarifier system, causing the fluid to sharply change direction before entering the cannula bore 68.

Figure 6A:
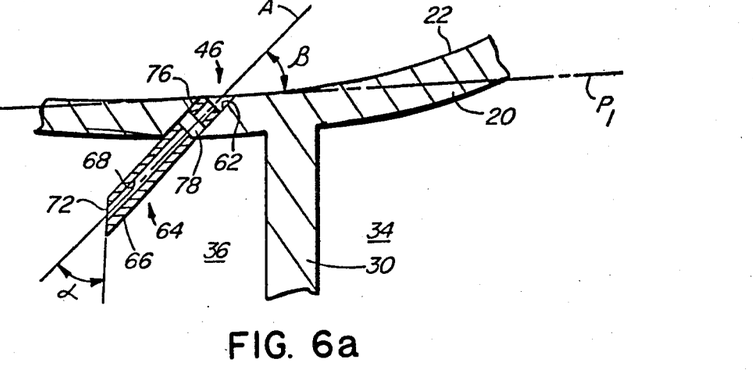
Figure 6B:
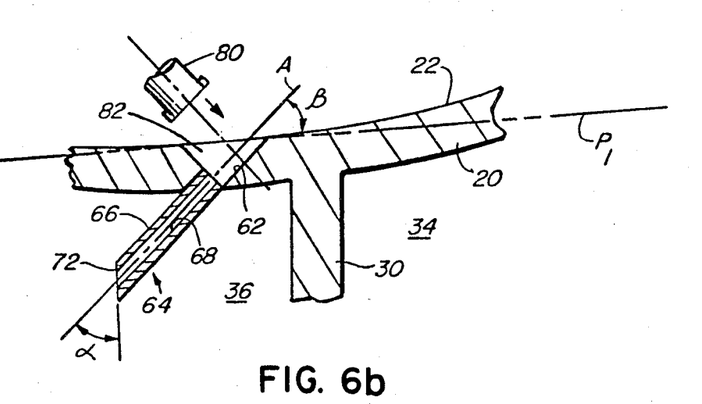
Figure 6C:
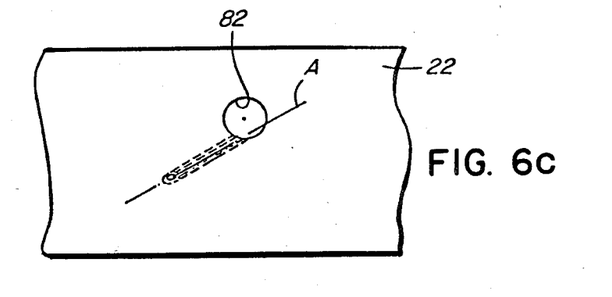

Alternative nozzle configurations are shown in FIG. 6a and in FIGS. 6b and 6c, both being variations on the configuration of FIG. 6. In FIG. 6a the cannula 64 is inserted into the bore 62 as in the previous embodiments, but it is inserted deeper into the bore 62 than before. A second length of cannula 76 is inserted into the bore 62 and is secured therein so that it is spaced from the upper end face of the cannula 64 by a gap 78. As in the embodiment of FIG. 6, the end of bore 62 adjacent the rail upper surface 22 is not filled and thus acts as a resonant chamber 74. The gap 78 between the portions 64, 76 of this "interrupted" cannula acts as a turbulence producing cavity, improving the fluid-flow characteristics.

FIGS. 6b and 6c show another nozzle configuration which is a variation on the embodiment of FIG. 6. In this instance, after drilling the bore 62, a circular cutter head such as 80 is fed towards the upper surface 22 of the rail along an axis normal to the nozzle axis A. However, the axis of the cutter head 80 could be offset laterally from the nozzle axis so that the resulting circular cavity 82 produced in the rail upper surface is also offset from the nozzle axis A. In other words, the nozzle does not meet the cavity 82 along a radius thereof. When the jet exits the nozzle it will be forced, by the side wall of the cavity 82, into a spiral, swirling flow pattern and will thus exit from the nozzle in a better dispersion pattern, improving the levitation efficiency.

THE SPLICES

The discussion so far has centered on the rail of the invention, including the nozzles utilized therewith. In any practical application, however, it will be necessary to join rails together in an end-to-end fashion. When joining the rails together it is essential to ensure that there is an absolute minimum of misalignment between the upper surfaces of adjacent rails, in view of the very thin fluid film supporting the load and the consequent closeness of the shoe outer surface to the rail surface. It is also necessary to compensate for rail-to-rail movement whether such movement be due to temperature changes, to the weight of the load travelling along the rail, or to shifting of the rail support. A splice-type of inter-rail connection has been achieved which meets all of the criteria enumerated above.

Figure 4:
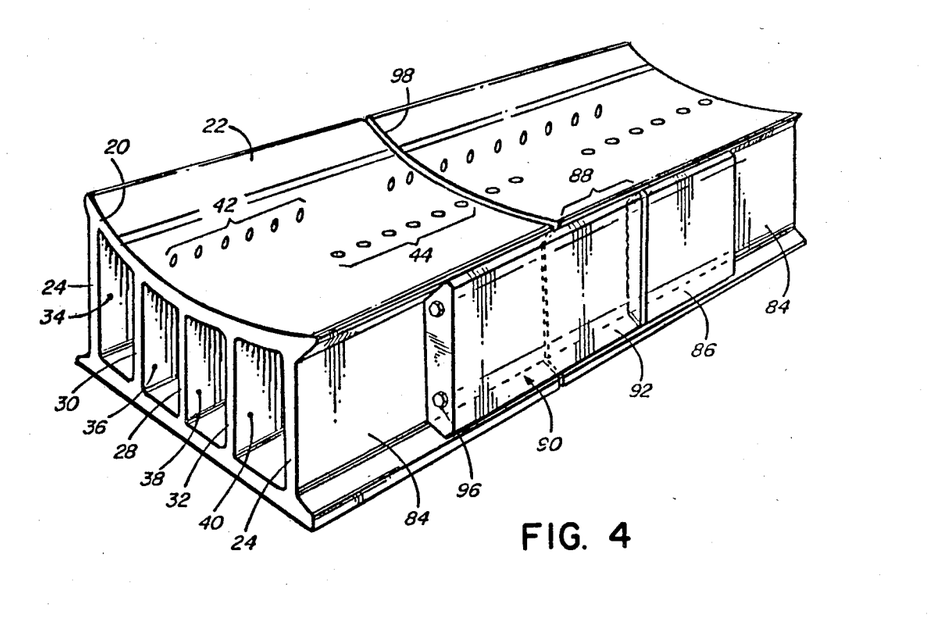
FIG. 4 shows an enlarged perspective view of a rail joint, with the nozzle overlap being illustrated.

FIGS. 1, 3 and 4 illustrate the connection system of the present invention.

As discussed above with respect to the rail itself, it was pointed out that the side walls 24 are inset from the longitudinal edges of the upper and lower walls 20 and 26, respectively. This creates a recess 84 along the outside of each side wall of the rail.

At one end of a rail, a spline member 86 is positioned in each of the recesses 84 and is secured to the rail in any suitable manner, as by bolts or welding. The cross-section of the spline member 86 generally conforms to that of the recess 84 (FIG. 3) so that the spline member 86 has a snug fit in the recess 84 and so that the spline member preferably does not extend laterally outwardly of the recess. As seen in FIG. 1, the spline member 86 is inset from one end of the rail section by a distance 88.

A second spline member 90 is secured in each recess 84 at the other end of the rail, the spline member 90 having the same cross-sectional configuration as the spline member 86. As can be seen in FIGS. 1 and 4, a portion 92 of the spline member 90 projects or extends beyond the adjacent end face of the rail, the length of the extension 92 being no less than that of the inset distance 88 and preferably slightly greater than that distance. Both spline members 86 and 90 are provided with longitudinally aligned and extending bores 94 which can receive bolts 96.

When joining or splicing rails end-to-end, as seen in FIG. 4, the extensions 92 of the spline members 90 of one rail are slid longitudinally into the corresponding inset recess portion 88 of the adjacent rails until the extensions 92 of the one rail butt against the spline members 86 of the adjacent rail. A resilient compressible gasket member, not shown, is preferably positioned in the gap 98 between the rails, the gasket having essentially the same cross-section as the rail. With the gasket in place, the bolts 96 are inserted through the bores 94 of the abutting spline members; nuts (not shown) are secured to the free ends of the bolts; and the connection is tightened until the end face of each spline member 90 is securely and tightly abutting the end face of its adjacent spline member 86. This tightening action compresses the gasket in the gap 98 and seals the gap against intrusion by moisture or dirt and against leakage from the pressurized ports. The gasket is dimensioned so that after it has been compressed between the end faces of the rails its uppermost edge will not project above the rail upper surface 22 and its inner edges will not project into any of the pressurized rail ports. End plates can be affixed to the rails with screws and a gasket to form rail end seals or, in conjunction with a loosely tightened splice bolt arrangement, can provide a slide type expansion joint while maintaining rail alignment. External flexible hoses would be used to provide continuity of fluid pressure from port to port as required.

APPLICATIONS

Figure 9:
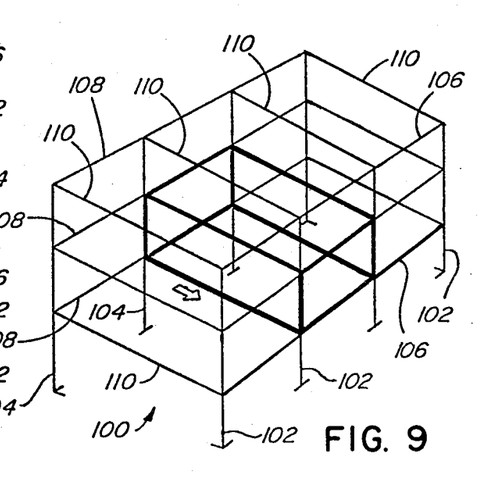
FIG. 9 shows a typical gravity flow racking system in which the rail of the present invention may be used.

As indicated previously, the rail of the present invention can be utilized in many different applications in which thin film levitation has advantages. One such application is in a warehousing situation in which it is desired to store quantities of goods in a gravity flow racking structure, the goods usually being piled on a pallet. FIG. 9 shows a typical racking structure 100 made up of vertical front and rear members 102, 104 and horizontal front, rear and side members 106, 108 and 110. The various vertical and horizontal frame members define pathways leading from the rear of the racking structure to the front, usually at a slight downward slope. A typical pathway has been heavily outlined in FIG. 9.

Figure 10:
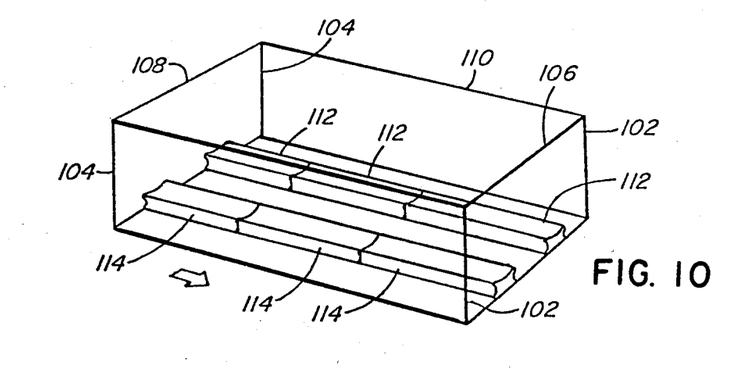
FIG. 10 shows an enlarged portion of the racking of FIG. 9 with rails in place.

FIG. 10 shows the pathway of FIG. 9 as it might appear with rails of the present invention utilized therein. The rails 112, 114 are joined end-to-end to form a two-rail track system 115, supported by the horizontal frame members 106, 108, the rails being spaced apart an appropriate horizontal distance to accept the longitudinally extending shoes supporting a load-carrying pallet (see FIG. 1). As indicated above, the rails slope downwardly from member 108 towards member 106 at an angle of about 1.5° to the horizontal so that, when in a fluid-levitated, supported condition, a pallet will tend to move downwardly along the track under the influence of gravity. In this way a separate movement-imparting power source is not required. The illustrated racking system is of the first-in first-out variety, in that a load introduced into the racking at the "high" or rear side will be taken out at the "low" or front side, the loads automatically accumulating at the low side.

Having established a working environment for the rail of the present invention, it is also necessary to establish a system for controlling the movement of pallets within that environment. Such a control system should preferably operate automatically to advance loads through a pathway in response to the introduction of a new load into the pathway and it should also be manually operable so that an operator can selectively advance loads in a particular pathway. Furthermore, the control system should be economic to operate so that it does not pressurize any more than the minimum length of the rails to achieve the desired load movement.

In its automatic mode, the control system should detect the presence of a load by detecting the pallet, the shoe, a lift fork, or any other element intimately associated with a new load, and in response to such detection, it should pressurize the rail ports to activate the group of nozzles at the high end of the track so that the load, when introduced therein, is supported by the fluid film generated by the fluid issuing from that group of nozzles. The load will advance over the initial group of nozzles under the influence of gravity until it encounters a non-pressurized space at which point it will come to halt. The control system can be programmed in accordance with the nozzle layout on the track to then advance the load as desired. For example, the control system might permit the first load to advance two load lengths before it is stopped, so that when another load is introduced into the pathway there will be a one-load length empty buffer space between the two loads, the first load advancing as the second load advances. When the unload end of the rails is reached, the spaced-apart loads will close up ranks until the pathway is filled. Similarly, when a load is removed from the rails at the unload end, the control system detects the load removal and can be programmed to provide a safety delay to prevent the loads behind the load being removed from advancing until the unload position has been vacated. Thereafter, the control system alternately energizes nozzle groups to index the accumulated loads in a controlled manner into the vacated space(s).

One particular advantage of using a rail according to the present invention in a racking environment is that the staggered nozzle groups prevent any runaway loads, a problem that exists with roller conveyor racking systems unless special retarding devices are utilized and matched to the particular load weight involved or would exist with air levitation systems which are continuously pressurized over the entire length thereof unless the fluid is pulsed in a programmed sequence or is controlled by cascade type valves. With the present invention the system is designed to take advantage of the staggered nozzle groups since, as a load comes to a non-pressurized group, it will halt its movement along the rail, even though the other nozzle groups, staggered with respect to the non-pressurized group, be pressurized. This is a significant safety advantage as it provides controlled movement of a load at all times.

Clearly, many different load-movement arrangements are available and different nozzle group patterns may be selected, depending on the load-movement arrangement to be followed. The control system is, in essence, a pneumatic or pneumo-electric circuit including various valves, timers, gates, actuators and switches which can be assembled by any competent technician to achieve the desired programmed movement pattern.

Figure 11:
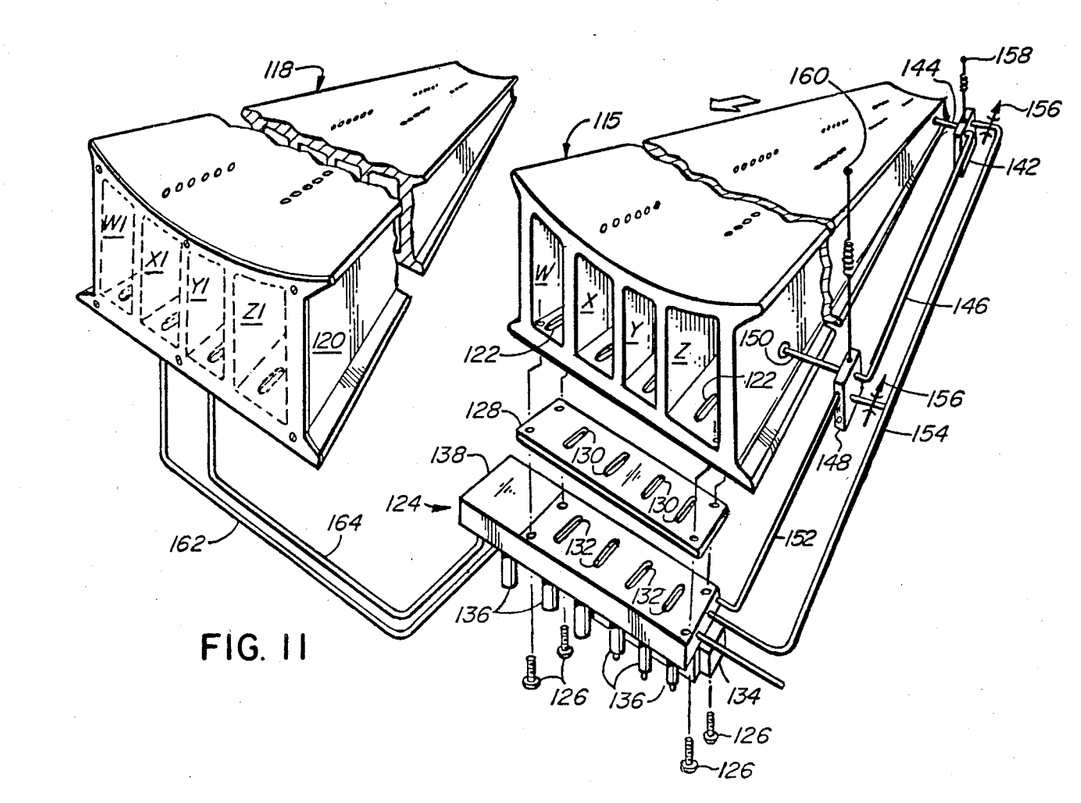
FIG. 11 shows a modular valve and a typical fluid control system.

Most components for the circuitry are off-the-shelf items although in at least one instance the unique rail configuration permits a very compact and efficient assembly, as particularly shown in FIG. 11. In that Figure a rail 116 is illustrated, having ports W, X, Y and Z extending lengthwise thereof. A companion rail 118 is also illustrated, having corresponding ports $W_1$, $X_1$, $Y_1$ and $Z_1$. Rail 118 is shown as having an end cover 120 thereon, the end cover and gasket having been secured to the rail in any suitable manner. The equivalent end cover has been omitted from the rail 116 for the sake of clarity.

Each port W, X, Y and Z is shown as having an aperture 122 extending through the bottom wall thereof, each aperture preferably being in the form of a round-ended slot. A modular valve and control block 124 may be bolted to the underside of the rail by way of bolts or machine screws 126 passing through suitable holes in the block 124 and the rail bottom wall. A gasket 128 may be compressed between the underside of the rail bottom wall and the top surface of the block 124 to seal the connection between the block and the rail. Gasket 128 has through-apertures 130 which mate with the apertures 122 in the rail and with apertures 132 in the block 124. "O"-ring type seals may be used in place of the gasket 128.

Block 124 is an assembly of several modules each performing its own separate function. For example, the block 124 includes a four-way, three position pilot operated spool valve 134, the details of which do not form a part of the present invention. In one position the spool valve will pneumatically connect port W with port X and in another position it will pneumatically connect port Z with port Y. The third position of the valve spool is a neutral position in which there are no pneumatic interport connections.

The block 124 also includes a number (six shown) of pneumatic circuit devices 136, which devices may be gates, timers, delays, or other logic control devices. Several of the devices may be adjustable so that desired operating conditions or criteria can be met. The circuitry for the logic devices, whether pneumatic, electric or both, may be housed in a manifold sub-base 138 through which the apertures 132 and the mounting screw holes pass. The circuitry contained within the sub-base 138 will depend on the arrangement of the logic devices 136.

In the system of FIG. 11 a normally-closed microswitch 142 is located at the "load" end of the rail 116 and is pneumatically connected to port Z by conduit 144. Conduit 146 leads to a normally-open microswitch 148 which is downstream of switch 142 and which is also connected to port Z, by a conduit 150. A conduit 152 connects the switch 148 to the valve/logic block 124. Another conduit 154 connects switch 142 to switch 148 and then to the block 124, the connections between the conduit 154 and the switches being by way of variable flow control valves 156 which valves provide a safety delay. Appropriate sensors, such as spring-loaded whiskers 158, 160 are used to activate switches 142, 148, respectively, when contacted by a load moving along the rail 116.

When rail 116 is in operation the two outermost ports W and Z are pressurized, say to about 80 psi, and the two innermost ports, X and Y, are not pressurized, those being the ports in fluid connection with the nozzle groups. With no load movement the three position valve 134 will be in its neutral position. Should a load activate switch 142 by moving the whisker 158 the normally closed switch will open, permitting fluid under pressure from port Z to flow via pilot lines 146, 152, 154 and normally open switch 148 to the logic block 124 wherein the pneumatic circuitry will cause the valve 134 to shift so that pressurized fluid can flow from one of the pressurized ports W or Z to the adjacent port X or Y via apertures 122, 130, 132 thereby providing energization of the nozzle groups associated with the newly pressurized port. The fluid issuing from the energized nozzles will levitate the load as it moves along the rail until it contacts the whisker 160 which closes switch 148 and changes the pilot pressure pattern leading to block 124. Depending on how the rail has been programmed, activation of switch 148 might cause valve 134 to return to its neutral position whereby neither port X or Y is pressurized and the lack of levitation fluid will bring the load to a halt through contact with the rail. Alternatively, the valve 134 might move to its opposite position wherein the other of the supply ports W or Z is connected to its adjacent port X or Y and the other groups of nozzles are energized, whereby the load will continue to move along the rail. Any number of switches may be positioned along the rail, or any programming controlled by the switches may be used, so as to control movement of a load therealong.

A significant advantage in power savings may be achieved with a modular control system as described above. When a pair of rails are laid parallel to form a track, as seen in FIG. 11, it is only necessary to pressurize one of the rails and to mount a control block 124 and appropriate switches to that rail since conduits 162, 164 can be connected between the four way valve 134 and directly to the two innermost ports $X_1$ and $Y_1$ of the adjacent rail. Pressurized fluid for the ports X and $X_1$ thus comes from the supply port W of rail 116 and pressurized fluid for the ports Y and $Y_1$ comes from the supply port Z of rail 116. Since the rails 116 and 118 would be identically constructed the unused apertures 122 in the ports $W_1$ and $Z_1$ of rail 118 could be blocked off and those ports could be used as additional pressurized surge reservoirs or, in the warehouse situation, they could be used as headers for an in-rack water sprinkler system.

It would not be necessary to mount the block 124 at the end of a rail as shown in FIG. 11. It could be mounted at any convenient position along the length of the rail or even remotely of the rail. A long rail installation, as perhaps used in a mass transit system might use additional valving and divide the nozzle port of each rail length into separate sections, as by using nozzle port dividers at a rail joint rather than a fully apertured gasket as previously described. The rail would then be, in essence, made up of a plurality of discrete lengthwise joined rail modules having separate nozzle ports but continuous pressurized supply ports. Each such module could be controlled by a system as described in FIG. 11 and each rail module could, in turn, include appropriate control valving so that as a load approached the end of one module the additional valving would be activated so as to pressurize the nozzle ports of the next rail module before the load meets that module, thereby ensuring smooth movement of the load along the rail while avoiding the necessity of continuously pressurizing the nozzle ports along the entire length of the rail.

The foregoing has described the main features and options of a rail according to the present invention, and of a track system using such a rail. The rail has been described as using a system of nozzles in two parallel rows, the nozzles of each row being arranged in aligned groups with a space between groups of a row and with the groups of one row being staggered with respect to the groups of the other row. Preferably, the groups are of uniform length, as are the spaces, although the spaces need not be of the same length as the nozzle groups, as when there is overlap between the end few nozzles of adjacent staggered groups.

One particular variation in nozzle arrangements has been previously described, that being for a curve wherein the spacing between the groups of one row is shortened until that row, in essence, becomes a row of continuous nozzles with each nozzle being spaced from the next nozzle in the row by the same amount. Both rows may be arranged in this manner or only one row, preferably the outer row of a curved rail, may be so arranged. In special banked cases, the space between adjacent groups of the other row is so great that no nozzles appear in that row in that portion of the rail.

Another variation in nozzle arrangements, known as sectionalization, may be utilized. In this instance very long nozzle groups may be used, along with shorter lengths, to achieve movement of a load for a considerable period before the load need stop. In a racking environment, for example, staggered nozzle groups might be used for the first 10 feet of a rail, allowing the load to index slowly therealong as the nozzle groups are alternately energized. The next 25 feet of rail might use a single group of nozzles to provide continuous movement of a load therealong and the last 20 feet might again use staggered shorter nozzle groups to achieve slower indexing movement of the load. Thus, while remaining consistent with the present invention, the nozzle group arrangements may be varied to achieve the desired load movement along the rail.

Yet another nozzle configuration may be utilized, especially in areas where the rail will be subjected to extreme dirt or heavy moisture conditions (fogging). Rails used in such environments could use double rows of nozzles operating on the opposite side of the rail centerline and directed towards the converging area of the shoe cavity at the seal area between the rail and the shoe. The jets issuing therefrom create additional dynamic action to overcome the additional frictional shear forces.

THE SHOE

The disclosure so far has dealt primarily with the rail of the present invention, although in certain instances, the shoe which is used with the rail has been at least referred to. The shoe per se is described in great detail in commonly assigned Canadian Pat. No. 1,066,645 of Nov. 11, 1979, but just as the rail of the basic invention has undergone revision so has the shoe.

In the prior shoe patent, the shoe was described as including as outer cover which is deformable under load and is capable of at least partial recovery under load removal, a central collapsible core, and a filler between the core and the cover, the filler also being deformable under load and being capable of at least partial recovery under load removal. A particularly efficient filler and core combination was found to be a specially wound roll of cellulosic extendable paper product.

Further testing has shown that the cellulosic product should be wound from a sheet that has its finish controlled precisely (very little variation) by using virgin pulps with a high percentage of groundwood. Groundwood appears to exhibit the original integrity of wood without the undesirable weakening of the fibre through chemical or thermal pulp processing inherent with sulphite or kraft pulps. Secondary or reclaimed fibres should be avoided. There is no need for an absorbent sheet and abosorbency should be avoided. Indeed, it is desirable to use some of the newly available water repellent means. The web should have high strength in tension, being wound as tightly as possible on the core to provide high density and hardness with maximum viscoelastic effect in terms of memory recovery of the fibres.

The core on which the web is wound should be strong to maintain the tension and alignment of the cellulose log, the log being the resulting roll after winding and having a desired length approximately equal to the length of the shoe. The core must also be able to collapse, as taught in the prior patent since such collapse (after final construction of the shoe and the first imposition of a load thereon) provides and maintains the necessary softer shoe footprint center portion (cavity 56, FIG. 8) while providing the harder outside two seal areas 58, 60 with graded degrees of variation throughout.

To utilize the maximum footprint length of the shoe, it should be square end sealed with flexible diaphragms which are welded or heat sealed in place to both the cellulose end of the log and the cover. Such an end seal will waterproof the interior of the shoe while permitting the necessary flexibility thereof. The bottom edge of the cover, at each end, may be heat formed with a slight upwards curvature to limit catching on projections. Also, the ends of the shoe can be formed as a "pocket" to collect debris, dirt particles, etc., which are picked up from the track.

As indicated previously, skin flutter or dither is a desirable phenomenon with the present invention, such flutter assisting in the propagation of the fluid film interface of the rail supporting surface and the shoe. This flutter might be considered as a "jackhammer" effect and is known to exist in hydrostatic bearings, usually detrimentally. With the shoe/rail combination, with the shoe using wound compliant material, the flutter vibrations are localized and controlled. With this in mind, it is possible to structurally alter the basic shoe so as to increase the dynamic pumping action of the shoe cover to thereby improve the spread or dispersion of the supporting and lubricating fluid film. Some proposed alterations are described hereinbelow with reference to FIGS. 12 to 15.

Figure 12:
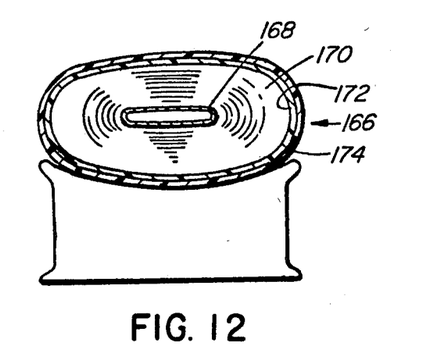
FIGS. 12 to 15 show transverse cross-sections of various alternative shoe structures.

FIG. 12 shows a simple dual cover shoe 166 wherein the core 168, filler 170 and cover 172 are inserted within a sheath 174 of slightly greater diameter and possibly of less thickness than cover 172. The propensity towards cover flutter should be greater than with a single-cover shoe. The outer cover 174 could use low-friction materials such as polytetrafluoroethylene, while the inner cover 172 could be stiffer and of a less costly material. The outer cover could even be a metallic foil.

Figure 13:
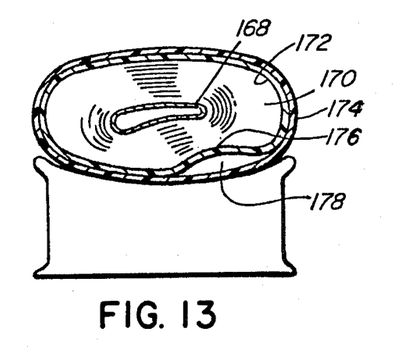

FIG. 13 shows a dual-cover shoe 166 wherein the inner cover 172 is distorted longitudinally as at 176 to provide a longitudinal pocket 178 between the inner and outer covers. The pocket 178 would aid in the production of cover flutter at the nozzle exit. The cavity or pocket 178 could be achieved by extruding the inner cover with distortion 176 therein or by any other suitable means.

Figures 14, 15, 16, 17, 18:
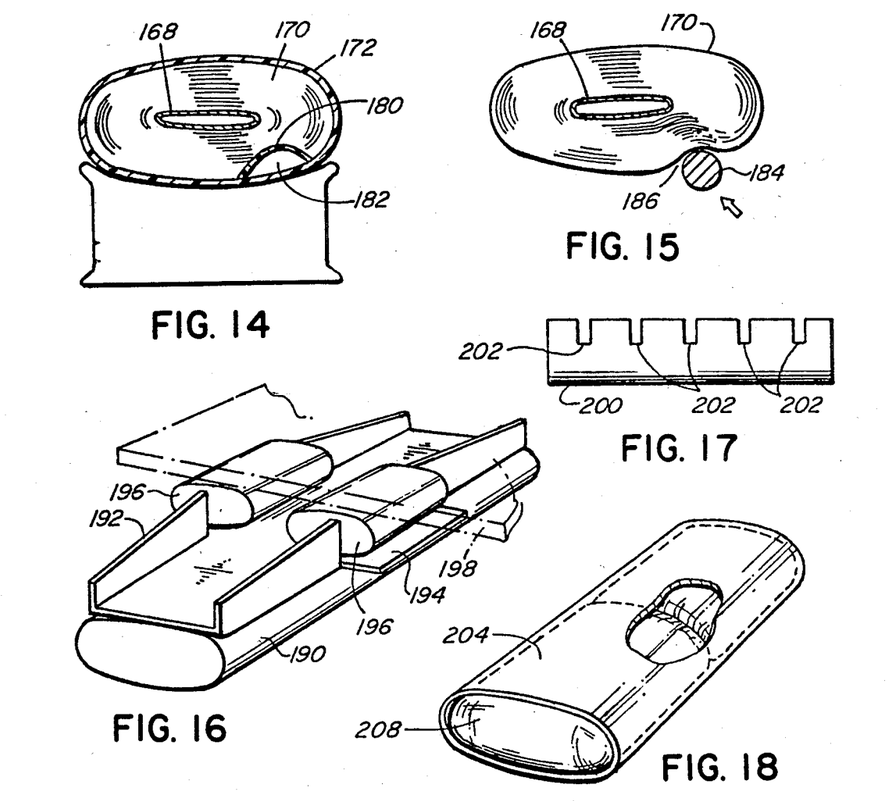
FIG. 16 shows an articulating support for a shoe with respect to a pallet or load.
FIG. 17 shows a second mechanism for obtaining a somewhat flexible shoe.
FIG. 18 shows a shoe having fluid bladders internally rather than the cellulosic filler and core structure presently used.

FIG. 14 shows a single cover shoe which achieves the same effect as the FIG. 12 embodiment by including an extruded or formed arch piece 180 of stiff plastic between the filler 170 and the inside surface of the cover 172, creating a pocket 182 which aids in the production of cover flutter.

FIG. 15 shows how the filler material 170 might be imprinted or "moulded" so as to have a cavity formed therein. After winding on the core 158 a longitudinally extending rod 184 could be thrust against the filler material to create the pocket 186. The cellulosic filler material could be sprayed with water or a plasticizer so as to harden the imprinted or indented area in the desired shape.

The foregoing has shown several ways of forming a suitable cavity in the shoe. Since the main purpose of the cavity is to provide an area in which cover vibrations can occur, it would be possible to provide a cavity in the rail itself, as by creating, during extrusion, a longitudinally extending concave depression in the rail upper surface in the same general area in which the shoe cavity, relatively speaking, would occur. This would simplify the overall construction of rails and shoes and would be equally efficient in promoting dither.

The embodiment of FIG. 12 is attractive if the shoe is to be used in conjunction with a linear induction motor (LIM) with the primary coil embedded in the rail. The outer cover 174 could be metallic or an amorphous metal foil and could act as the secondary for the LIM. The shoe/rail system is conducive to LIM's due to the small air gap between the shoe and the rail, making the LIM very efficient. An alternative secondary would be achieved by interleaving amorphorous metal sheets in the outer plies of the filler.

The optimum length of a shoe for material handling and other application is about 48 inches. Such a long shoe makes it necessary for any curves to have a large radius of curvature if the shoe is to remain in the upper profile of the rail and be levitated by supporting fluid. It is desirable to reduce the length of the shoe to about 24 inches, in which case shoes would have to be mounted in tandem to achieve the design load-handling capabilities. Such shoes should also be articulated somewhat to accommodate rail irregularities and smaller radii. FIG. 16 shows one means of articulating a shoe so as to achieve limited pitch and yaw movement. In this instance a short shoe 190 is affixed to a longitudinally extending U-shaped bracket 192 having a central cut-out and platform section 194. Within that section are mounted two short-length shoe sections 196 secured at the bottom thereof to the bracket 192 and at the top thereof to the underside of the pallet or load 198. The short shoes 196 further isolate the load from the rail, provide additional springing and isolation, and permit limited relative pitch and yaw of the shoe 190 with respect to the load 198, while limiting roll.

FIG. 17 shows another shoe embodiment wherein the shoe 200 has a plurality of transverse cuts 202 extending therethrough, the cuts being only in the upper half of the shoe. The interior of the shoe at the cuts would have to be waterproofed as by applying flexible tape over each cut. Such a shoe would exhibit increased flexibility for curves or elevation changes while maintaining proper footprint length requirements. There would have to be a certain degree of flexibility in the mounting of the shoe to a pallet or load 198 to take advantage of the increased shoe flexibility.

All discussions of the shoe so far has centered about the shoe having a wound cellulosic filler material. It is possible that newly-developed glass fibre reinforced epoxy composites might exhibit properties similar to those of cellulose when wound in tension and would be acceptable as filler material. Another possible substitute for a shoe filler, eliminating the core, is shown in FIG. 18 wherein the shoe cover 204, is filled with a plurality (at least two) of strong and flexible air bladders 208 which are pressurized to between 10 and 30 psi. It would be necessary to use at least two bladders to improve stability in yaw and pitch, the shoe duplicating the previously-described cell supporting systems by the abutting end walls of the bladders and by the outward forces exerted by the internal pressures of the bladders. Such shoes might be useful where weight is a factor or in applications where vibration absorption by the cellulose filler is not essential. For efficiency, isolation and load-carrying capacity, the cellulosic-filler type of shoe is preferred.

The embodiments of the invention in which an exclusive property or privilege is claimed are defined as follows:

1. A load supporting means for positioning between a load and a load supporting surface, said means being capable of supporting said load and of substantially isolating said load from forces influencing the position of said surface, said means comprising: a generally tubular outer member formed of a flexible, partially deformable material capable of deformation under load and at least partial recovery after load removal; an annular deformable core extending generally axially within said outer member to create a generally annular cavity between said core and said outer member; a web of cellulosic material wound tightly on said core and filling said cavity, said cellulosic material being formed from a paper-like web having high tensile strength and a negligible degree of extensibility; and an annular sheath member covering said outer member, said sheath member being capable of vibration under the influence of pressurized fluid issuing from said load supporting surface.

2. The invention of claim 1 wherein said sheath member has a wall that is thinner than the wall of said outer member.

3. The invention of claim 1 wherein said outer member is stiffer than said sheath member.

4. The invention of claim 1 wherein said sheath member is formed of polytetrafluoroethylene.

5. The invention of claim 1 wherein said sheath member is formed of metallic foil.

6. The invention of claim 1 and including a longitudinally extending inwardly directed depression in said outer member, creating a longitudinally extending pocket between said outer member and said sheath member in the vicinity of said depression.

7. The invention of claim 1 and including a metallic foil material interleaved with said wound web adjacent said outer member to act as a secondary for a linear induction motor.

8. The invention of claim 1 and including a flexible diaphragm member at each end of said load supporting means, each said diaphragm member being secured to said outer member and said cellulosic material.

9. The invention of claim 8 wherein said outer member includes a plurality of transverse cut-out sections in the upper half thereof.

10. The invention of claim 1 and including a longitudinally extending bracket member to which said load supporting means is attached, said bracket including a central open area above said means, said open area being adapted to receive a pair of longitudinally directed short lengths of the load supporting means.

11. A load supporting means for positioning between a load and a load supporting surface, said means being capable of supporting said load and of substantially isolating said load from forces influencing the position of said surface, said means comprising: a generally tubular outer member formed of a flexible, partly deformable material capable of deformation under load and at least partial recovery after load removal; an annular deformable core extending generally axially within said outer member to create a generally annular cavity between said core and said outer member; a web of cellulosic material wound tightly on said core and filling said cavity, said cellulosic material being formed from a paper-like web having high tensile strength and a negligible degree of extensibility; and means defining a longitudinally extending, inwardly directed depression in the outer portion of said filler material adjacent said outer member to create a longitudinally directed pocket in the vicinity of the depression between the filler material and the outer member, the pocket serving to enhance the ability of said outer cover to vibrate under the influence of pressurized fluid issuing from said load supporting surface.

12. The invention of claim 11 wherein said depression defining means includes a longitudinally directed transversely curved arch piece positioned between said cellulosic filler and the inner surface of said outer member, the longitudinal edges of said arch piece contacting said inner surface so as to create said longitudinally extending pocket between said arch piece and said outer member.

13. The invention of claim 11 and including a flexible diaphragm member at each end of said load supporting means, each said diaphragm member being secured to said outer member and said cellulosic material.

14. The invention of claim 11 and including a metallic foil member interleaved with said wound web adjacent said outer member to act as a secondary for a linear induction motor.

15. The invention of claim 11 and including a longitudinally extending bracket member to which said load supporting means is attached, said bracket including a central open area above said means, said open area being adapted to receive a pair of longitudinally directed short lengths of the load supporting means.

16. The invention of claim 11 wherein said outer member includes a plurality of transverse cut-out sections in the upper half thereof.

17. A load supporting means for positioning between a load and a load supporting surface, said means being capable of supporting said load and of substantially isolating said load from forces influencing the position of said surface, said means comprising a generally tubular outer member formed of a flexible partly deformable material capable of deformation under load and at least partial recovery under load removal, and, internally of said member, a plurality of longitudinally adjacent inflatable bladder members for peripherally prestressing said outer member.

18. The invention of claim 17 wherein at least three of said bladder members are located within said outer members, said bladder members being inflatable to a pressure of between 10 and 30 psi.

* * * * *